(12) United States Patent
Nelle et al.

(10) Patent No.: US 6,446,350 B1
(45) Date of Patent: Sep. 10, 2002

(54) METHOD AND ARRANGEMENT FOR REDUCING TEMPERATURE-RELATED DIMENSIONAL DISCREPANCIES IN MEASUREMENT SYSTEMS ARRANGED IN PARALLEL

(75) Inventors: Günther Nelle, Bergen; Sebastian Tondorf, Waging, both of (DE)

(73) Assignee: Johannes Heidenhain GmbH, Traunreut (DE)

( * ) Notice: Subject to any disclaimer, the term of this patent is extended or adjusted under 35 U.S.C. 154(b) by 0 days.

(21) Appl. No.: 09/459,827

(22) Filed: Dec. 13, 1999

(30) Foreign Application Priority Data

Dec. 11, 1998 (DE) .......................... 198 57 132

(51) Int. Cl.$^7$ .......................... G01B 11/04; G01B 5/004; G01B 7/04
(52) U.S. Cl. .......................... 33/702; 33/503
(58) Field of Search .......................... 33/702, 703, 704, 33/706, 707, 708, 503, 504, 1 M, DIG. 3, DIG. 21

(56) References Cited

U.S. PATENT DOCUMENTS

| | | | |
|---|---|---|---|
| 4,676,649 A | | 6/1987 | Phillips |
| 4,808,048 A | | 2/1989 | Miller |
| 4,895,454 A | | 1/1990 | Kammleiter et al. .......... 374/163 |
| 4,912,856 A | * | 4/1990 | Ernst .......................... 33/702 |
| 5,053,973 A | | 10/1991 | Fujii et al. |
| 5,068,972 A | * | 12/1991 | Herzog et al. .............. 33/1 M |
| 5,182,867 A | | 2/1993 | Nelle .......................... 33/702 |
| 5,189,807 A | | 3/1993 | Gustafsson .................. 33/702 |
| 5,253,430 A | | 10/1993 | Rieder et al. ................ 33/702 |
| 5,279,043 A | | 1/1994 | Rieder et al. ................ 33/702 |
| 5,333,386 A | | 8/1994 | Breyer et al. |
| 5,375,338 A | | 12/1994 | Nelle .......................... 33/702 |
| 5,650,852 A | * | 7/1997 | Chastain et al. ............. 33/702 |
| 6,092,296 A | * | 7/2000 | Nelle .......................... 33/700 |
| 6,145,213 A | * | 11/2000 | Shimano et al. ............. 33/702 |
| 6,161,298 A | * | 12/2000 | Bernhardt et al. ........... 33/702 |
| 6,167,634 B1 | * | 1/2001 | Pahk et al. .................. 33/702 |
| 6,171,302 B1 | * | 1/2001 | Talpalriu et al. ............ 33/706 |
| 6,272,760 B1 | * | 8/2001 | Wiedmann et al. .......... 33/1 M |

FOREIGN PATENT DOCUMENTS

| | | |
|---|---|---|
| DE | 36 33 573 C1 | 4/1988 |
| DE | 37 29 644 C 1 | 3/1989 |
| DE | 39 24 748 A1 | 3/1990 |
| DE | 41 00 062 | 7/1991 |
| DE | 41 00 062 A1 | 7/1991 |
| DE | 41 34 371 A1 | 4/1993 |
| DE | 42 12 970 | 10/1993 |
| DE | 42 12 970 A 1 | 10/1993 |
| DE | 44 09 148 C 2 | 9/1995 |
| DE | 195 31 676 | 11/1996 |
| DE | 195 31 676 C 1 | 11/1996 |
| DE | 44 09 148 | 7/1997 |
| DE | 37 29 644 | 9/1997 |
| DE | 197 03 735 | 8/1998 |
| DE | 197 03 735 A 1 | 8/1998 |
| EP | 0 284 671 | 12/1987 |
| EP | 0 284 671 A1 | 10/1988 |
| EP | 0 513 406 | 5/1991 |
| EP | 0 479 766 | 9/1991 |
| EP | 0 498 780 | 1/1992 |
| EP | 0 506 649 | 3/1992 |
| EP | 0 479 766 A2 | 4/1992 |
| EP | 0 498 780 A1 | 8/1992 |
| EP | 0 506 649 A2 | 9/1992 |
| EP | 0 513 406 A1 | 11/1992 |
| EP | 0 304 307 A2 | 2/1998 |

* cited by examiner

*Primary Examiner*—Diego Gutierrez
*Assistant Examiner*—Yaritza Guadalupe
(74) *Attorney, Agent, or Firm*—Kenyon & Kenyon

(57) ABSTRACT

A measurement system is described having parts that are not joined directly to the machine being measured, so that a change in the geometry of the machine cannot result in a shifting of the measurement systems relative to one another. The shifting of the measurement systems with respect to one another can also be compensated for by determining the change in the geometry of the machine and of the measurement systems, and compensating the measured value errors in accordance with a mathematical model for the change in geometry.

14 Claims, 6 Drawing Sheets

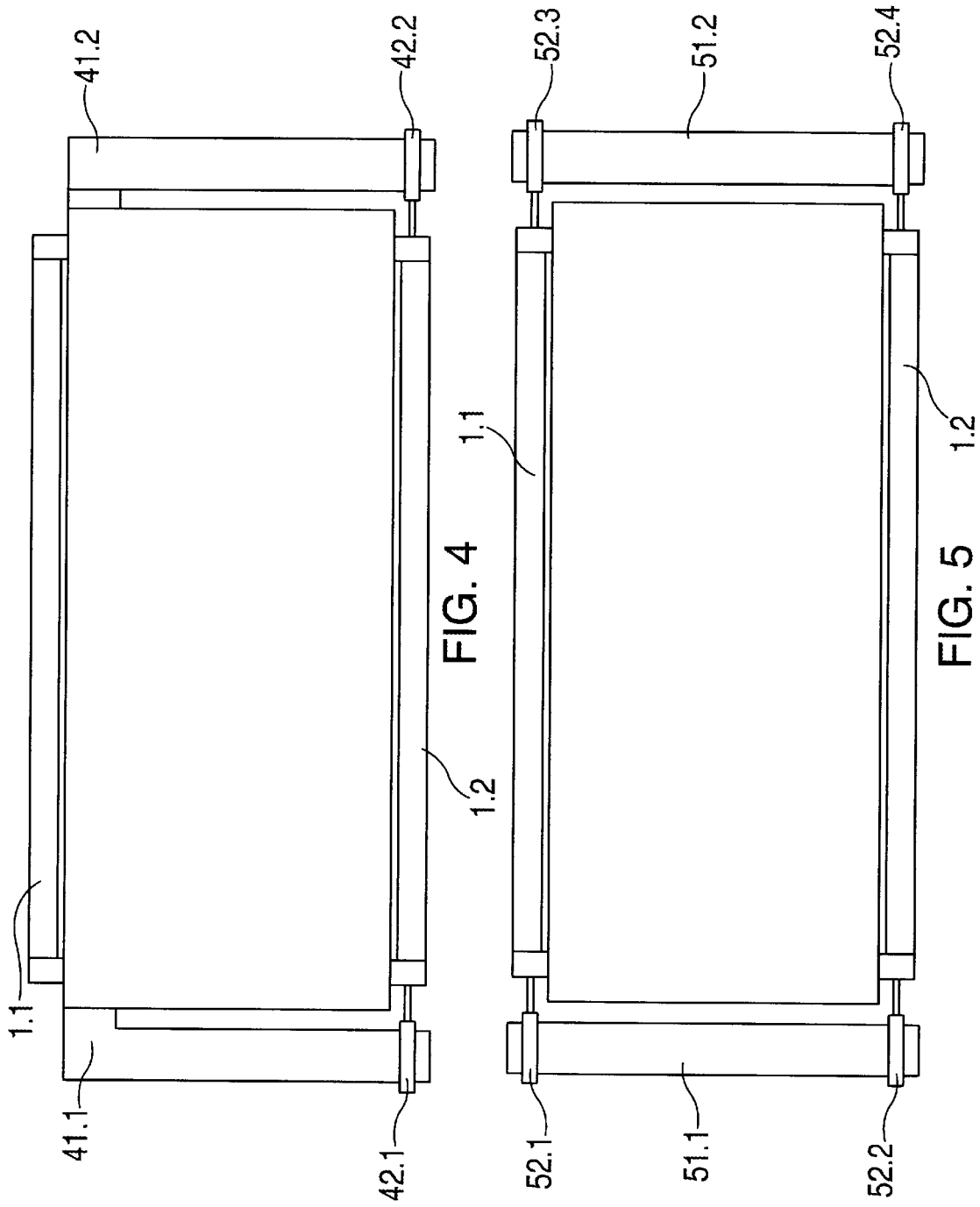

METHOD AND ARRANGEMENT FOR REDUCING TEMPERATURE-RELATED DIMENSIONAL DISCREPANCIES IN MEASUREMENT SYSTEMS ARRANGED IN PARALLEL

The invention relates to an arrangement for ascertaining and reducing temperature-related dimensional discrepancies of measurement systems arranged in parallel, and a method for compensating for the ascertained dimensional discrepancies.

DESCRIPTION OF RELATED ART

German Patent 195 31 676 C1 discloses an apparatus for compensating for guide tolerances in multi-axis positioners. In this apparatus, a second guide support is mounted, shiftably with respect to a first axis by way of an associated positioner drive, on a first guide support. A further guide support or an object is mounted, shiftably with respect to a second axis by way of an associated positioner drive, on the second guide support. The respective shift on the guide supports is continuously ascertained by way of a coordinate measurement apparatus associated with the supports. For this purpose, respective measurement devices are aligned parallel to the guide on the guide supports, and discrepancy measurement apparatuses that are acted upon by the individual measurement devices are arranged respectively on the guided part. The discrepancy measurement apparatus is arranged in such a way that the discrepancy measurement signal in each case indicates at least one positional discrepancy transversely to the direction of the incident measurement beam.

German Patent 195 31 676 C1 thus does not disclose how temperature-related measurement discrepancies of measurement systems arranged in parallel can be ascertained or compensated for.

Machines that have a gantry structure are especially susceptible to problems because they have two guides, two drive systems, and two measurement systems that are provided for displacement in one axial direction. To ensure that this gantry structure does not jam in the event of a non-homogeneous temperature-related expansion of the measurement systems whose output signals are used to control the drive assemblies, differences in the temperature-related expansion of the two longitudinal measurement systems must be compensated for.

It is known in the existing art to measure the temperature at each of several locations on the arrangement. Taking into account the specific coefficients of thermal expansion, the temperature-related longitudinal changes of the measurement systems are then calculated and compensated for.

It is disadvantageous in this context that the coefficients of thermal expansion of the longitudinal measurement systems and of the machine can be only imprecisely determined. Especially with large machines, the expansion of the machine on a first side is influenced by the expansion, due to the temperature difference, on a second side of the machine. The longitudinal measurement systems mounted on the two machine sides are also shifted relative to one another by the change in the geometry of the machine. Such a shift of the measurement systems inevitably results in jamming of a gantry assembly whose drive systems on each side are controlled on the basis of the output signals of the measurement systems.

SUMMARY OF THE INVENTION

An arrangement is described in which a shift of one part of the measurement systems relative to another part, as a result of temperature-dependent geometry changes, can no longer occur. Alternatively, an arrangement is described for ascertaining temperature-related dimensional discrepancies of measurement systems arranged in parallel, and a method for compensating for them.

In one embodiment, the invention is an arrangement for reducing temperature-related dimensional discrepancies of two measurement systems arranged in parallel for machines having a gantry structure, that includes at least one connecting bridge having a substantially temperature-independent geometry, disposed between the two measurement systems, and connecting points at which the at least one bridge meets the two measurement systems providing an immovable connection with the measurement system in a measurement direction. The invention can also include at least one measurement device adapted to measure a shift between the at least one connecting bridge and at least one of the two measurement systems.

In another embodiment, the invention is a method for reducing temperature-related dimensional discrepancies of at least two measurement systems arranged in parallel in a machine having a gantry structure, having the steps of determining a shift between end points of the at least two parallel measurement systems in a measurement direction, creating a model to estimate the shift and correction values, and correcting measured values of the at least two parallel measurement systems using the correction values determined in the model.

The arrangement according to the present invention has the advantage that because of a connecting bridge whose geometry has at most a very small dependence on temperature, either two measurement systems aligned in parallel are immobilized directly with respect to one another, or changes in the measurement systems in the measurement direction are ascertained by way of additional measurement devices attached to the connecting bridge, in the region of the ends of the measurement systems. The values ascertained by the measurement devices on the connecting bridge are used to compensate for the measurement values ascertained by the measurement systems aligned in parallel. The connecting bridge can be implemented either by way of a material with the lowest possible coefficient of thermal expansion, or by way of a light beam that is used to determine the shifting of one of the parallel longitudinal measurement systems relative to the other.

BRIEF DESCRIPTION OF THE DRAWINGS

Details of the invention are explained in more detail below with reference to the embodiments depicted in the drawings, in which:

FIG. 4 shows a third embodiment of an arrangement according to the present invention;

FIG. 5 shows a fourth embodiment of an arrangement according to the present invention;

DETAILED DESCRIPTION OF THE PREFERRED EMBODIMENTS

Figure 1:
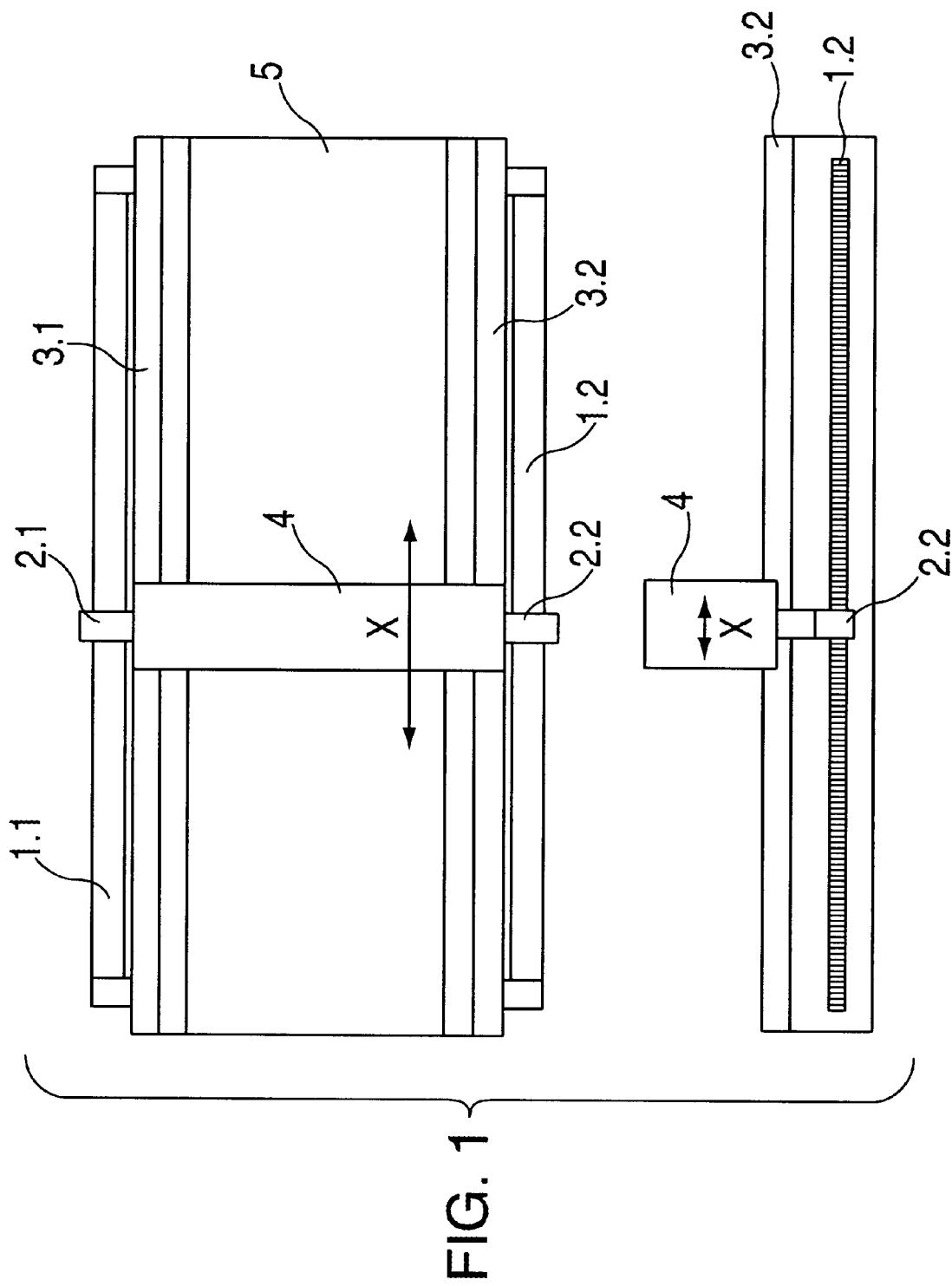
FIG. 1 shows a top plan view and a side elevation view of a machine having a gantry structure.

FIG. 1 shows top and a side view of a gantry structure in schematic fashion. Processing space 5, on which the workpiece being processed is located, is delimited by guide tracks 3.1 and 3.2 along which a gantry axis 4, running perpendicular to the two guide tracks 3.1 and 3.2, can be displaced. Scales 1.1 and 1.2 for longitudinal measurement systems are respectively provided along guide tracks 3.1 and 3.2, outside processing space 5. These scales 1.1 and 1.2 are scanned by scanning units 2.1 and 2.2 that are attached each on one side of the gantry axis.

When the machine is non-homogeneously heated, a non-homogeneous change in the geometry of the machine occurs, and thus a relative shift with respect to one another of scales 1.1 and 1.2 joined to the machine also occurs. More specifically, gantry axis 4 is moved in the direction X, and a separate drive system is provided for each side of the gantry axis 4, to move it along tracks 3.1 and 3.2. Each drive system is controlled respectively by the longitudinal measurement systems 1.1, 2.1 and 1.2, 2.2. The two drive systems must operate in perfect synchrony to prevent canting of the gantry axis 4. Temperature effects can disturb this synchrony, if one side of gantry axis 4 heats up differently from the other side. Such heating influences the position of scales 1.2 and 1.2 relative to each other in the X direction.

This difference in the relative position of scales 1.1 and 1.2 with respect to one another, the two sides of gantry axis 4 can be positioned differently by their respective drive systems, causing a canting of the axis.

The present invention can either prevent this differential shift between the position of the two ends of gantry axis 4, or can measure the shift so that it can be compensated for.

Figure 2:
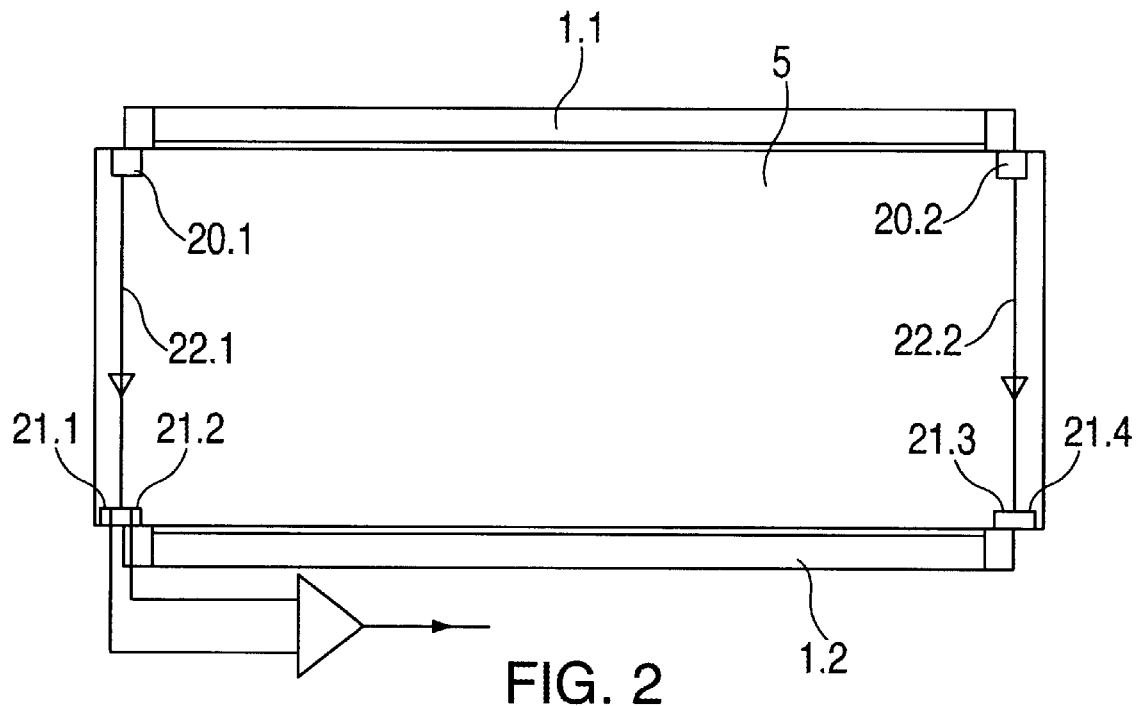
FIG. 2 shows a first embodiment of an arrangement according to the present invention.

The arrangement according to the present invention depicted in FIG. 2 is used to allow quantification of any relative shifting of the two scales 1.1 and 1.2. FIG. 2 shows the two scales 1.1 and 1.2. Scales 1.1 and 1.2 are rigidly secured at their ends to a machine bed 5, but in the interest of simplification, the machine itself has been omitted from the drawing.

According to the present invention, a laser 20.1 is arranged in the end region of at least one of the two parallel scales 1.1 and 1.2, and is immovably joined to the end of scale 1.1, to the machine bed, or both. Laser beam 22.1 radiates in the direction of the other scale 1.2, preferably perpendicular to the measurement direction, at a thermally stable angle. Laser beam 22.1 strikes the other scale 1.2 in the region of the end of the other scale 1.2. Photodiodes 21.1 and 21.2 are arranged there, next to one another, in such a way that in a calibrated state, i.e. at calibration temperature and with no change in the geometry, laser beam 22.1 strikes substantially between the two photodiodes 21.1 and 21.2. A second laser 20.2 could also be used to produce a second laser beam 22.2.

As soon as any non-homogeneous heating results in a change in the geometry of the machine, the one end of scale 1.1 to which laser 20.1 is attached shifts relative to the other opposite end of scale 1.2, where photodiodes 21.1 and 21.2 are attached. This results in a change, as compared to the calibrated state, in the radiation intensity of laser beam 22.1 striking the two photodiodes 21.1 and 21.2. By differential amplification of the two output signals of photodiodes 21.1 and 21.2 in a differential amplifier, the latter outputs a voltage proportional to the relative shift of the two scales 1.1 and 1.2 with respect to one another.

A laser 20.2 and two photodiodes 21.3 and 21.4 are similarly attached at the other two ends of scales 1.1 and 1.2, and ascertain the relative shift of the other end of scale 1.2 with respect to the other end of scale 1.1.

The photodiodes used can also be vertically sensitive. For example, they can be four-quadrant photodiodes, so that the vertical geometry change of scales 1.1 and 1.2 can also be determined. The connecting bridge between scale 1.1 and 1.2 is in this case implemented by a laser beam that exhibits no temperature-dependent geometry change. The connecting points of the connecting bridges at scale 1.1 are immobilized by the fact that laser 20.1 or 20.2 is immovably joined to the two scale ends of scale 1.1. Shifts of the connecting points of the connecting bridges on scale 1.2 are ascertained by way of the changes that occur in the voltages of photodiodes 21.1 and 21.2, and 21.3 and 21.4, and are used to quantify the geometry change and compensate for it.

Figure 3:
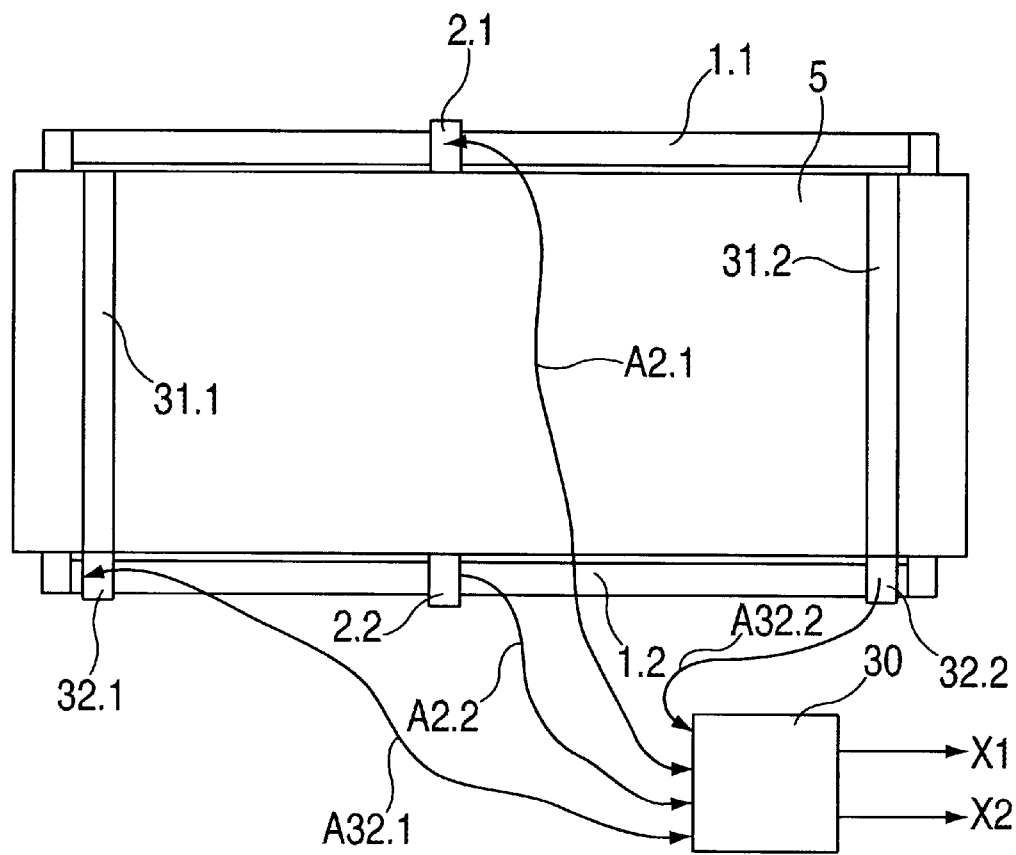
FIG. 3 shows a second embodiment of an arrangement according to the present invention.

FIG. 3 shows another embodiment according to the present invention. Connecting bridge 31.1 is immobilized at one end in the region of the end near one of the two scales, for example scale 1.1. At the other end, connecting bridge 31.1 has a scanning head 32.2 for scale 1.2. Scales 1.1 and 1.2 are rigidly secured at their ends to a machine bed 5. If a shift of scale 1.2 relative to scale 1.1 then occurs, this shift is quantified by scanning head 32.1 which scans scale 1.2. A connecting bridge 31.2 of this kind is also provided at the other two ends of scales 1.1, 1.2. One end is immobilized in the end region of a first scale 1.1, and the other end carries a scanning head 32.2 for the other scale 1.2. It is important to ensure that the material from which connecting bridges 31.1 and 31.2 are made exhibits the lowest possible coefficient of thermal expansion. This ensures that the connecting bridges are not also subjected to temperature-dependent geometry changes. Once the relative shifting of the two ends of scale 1.2 with respect to the two ends of scale 1.1 has been quantified, a model can be determined for the temperature-dependent change from a first to a second parallel scale in the measurement direction, with which any value measured by scanning heads 2.2 or 2.1 can be corrected. In this exemplary embodiment, the scale is additionally used by one of the two measurement systems 1.2 for determining the geometry change in the measurement direction.

The connecting bridge can be designed in such a way that its temperature-dependent expansion is almost zero. It appears especially advantageous to implement scanning head 32.1 or 32.2 for scale 1.2 at the connecting point of two struts, joined in a V-shape and made of Invar or Vacodil, whose other ends are immovably joined to the machine in the region of the end of the other scale 1.1.

The output signals of the measurement systems for scales 1.1 and 1.2 are conveyed to an electronic compensation system 30 in which the mathematical model for expansion of the scales is calculated. Provided for this purpose is a processor in which there is already stored a higher-order model for which coefficients are calculated as a function of the values ascertained in scanning heads 32.1 and 32.2. Electronic compensation system 30 is connected to scanning heads 32.1, 32.2, and to scanning heads 2.1, 2.2, for example by electrical connections. The measured values of scanning heads 2.1 and 2.2 are then corrected using a correction value, specific to each measured value, that is ascertained using the model. Alternatively, correction of the values ascertained by way of scanning heads 2.1 and 2.2 can also be accomplished in a control system that implements further control functions for the machine.

FIG. 4 depicts a further embodiment according to the present invention. Similarly to the previous exemplary embodiment, one end of each of two temperature-stable connecting bridges 41.1 and 41.2 is immobilized in the end region of one scale 1.1. Provided at the respective other ends of connecting bridges 41.1 and 41.2 there is a probe 42.1 and 42.2 that quantifies the shifting of the ends of the other scale 1.2 in the measurement direction relative to scale 1.1. Using these measured values, it is in turn possible to determine a model for the temperature-related geometry change in scale 1.2 relative to scale 1.1. As compared to the exemplary embodiment of FIG. 3, this implementation includes special measurement devices (probes 42.1 and 42.2) that are used to ascertain the relative shifting of a first scale 1.1 with respect to a second scale 1.2.

Connecting bridges 41.1 and 41.2 are attached at one narrow point on the machine. This one connection ensures that connecting bridges 41.1 and 41.2 do not deform if the geometry of the machine changes as a function of temperature. It is also possible thereby to prevent excessive heat transfer from the machine to connecting bridges 41.1 and 41.2. Another alternative to this is a one-sided connection of connecting bridges 41.1 and 41.2 to the foundation on which the machine is also installed.

FIG. 5 depicts an exemplary embodiment of the arrangement according to the present invention having four measurement probes, which quantify the shifting of the ends of scales 1.1 and 1.2 in the measurement direction. These measurement probes a-re mounted on temperature-stable connecting bridges. As in the embodiments shown in FIGS. 3 and 4, scales 1.1 and 1.2 are rigidly secured at their ends to a machine bed 5. As soon as the geometry of the machine changes and the ends of scales 1.1 and 1.2 thereby shift, measurement probes 52.1 to 52.4 are correspondingly actuated. From these measured values it is in turn possible to calculate a model for the change in the geometry of the machine, and each measurement point of the measured values ascertained via scanning units 2.1 and 2.2 of gantry axis 4 can be corrected. An embodiment of this kind is particularly advantageous if, when temperature changes occur, connecting bridges 41.1 and 41.2 of FIG. 4 from the ends of the one measurement system 1.1 to the ends of the other measurement system 1.2 do not remain parallel to the original machine geometry prior to heating.

Figure 6:
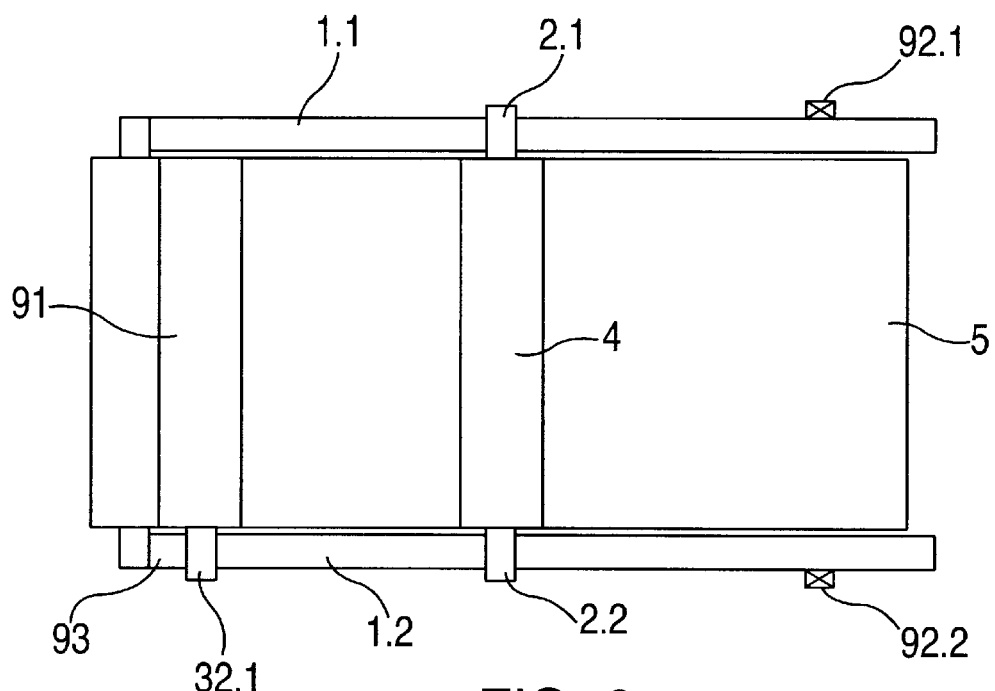
FIG. 6 shows a fifth embodiment of an arrangement according to the present invention.

All the exemplary embodiments described so far are based on the assumption that scales 1.1 and 1.2 are attached to the machine in the region of their ends. If, however, only one attachment is provided in the region of a single end of each scale 1.1 and 1.2, as depicted in FIG. 6, a temperature-stable connecting bridge 91 can be provided only in the region of these immobilized ends of scales 1.1 and 1.2. One end of the connecting bridge can be attached in the region of one end of a first scale 1.1, while the other end of connecting bridge 91 carries a scanning head with which the shift of the other scale 1.2 relative to first scale 1.1 is measured. Temperature sensors 92.1 and 92.2 are arranged in the region of the other ends of scales 1.1 and 1.2. Assuming a constant temperature over the entire scale length, and assuming the coefficient of expansion of the scale material is known, a model can then be calculated for the temperature-dependent expansion of scales 1.1 and 1.2, and the values measured at gantry axis 4 can be corrected.

Since the scales shown in FIG. 6 are secured to the machine bed 5 on only one end, the relative shift of one scale end with respect to the other scale end in the X direction is measured by the scanning head 32.1. Except at the secured end, the scales 1.1, 1.2 are decoupled from the machine bed 5, for example by inserting between the scales 1.2, 1.2 and the machine bed 5 an oil film, an elastic adhesive layer, or by any other known method. In response to a temperature change, scales 1.1, 1.2 expand from the secured end on the left, as shown in FIG. 6, to the free end on the right. The expansion is a function of only the temperature and the scale material properties, and thus can be easily calculated by a temperature measurement using temperature sensors 92.1, 92.2.

The position measured by scanning heads 2.1, 2.2 can thus be corrected by the value measured by scanning head 32.1, which measures the mutual shift of the two scales 1.1, 1.2, and by the temperatures measured by sensors 92.1, 92.2, which can be correlated to the length change of scales 1.1, 1.2 independently of the machine.

Figure 7:
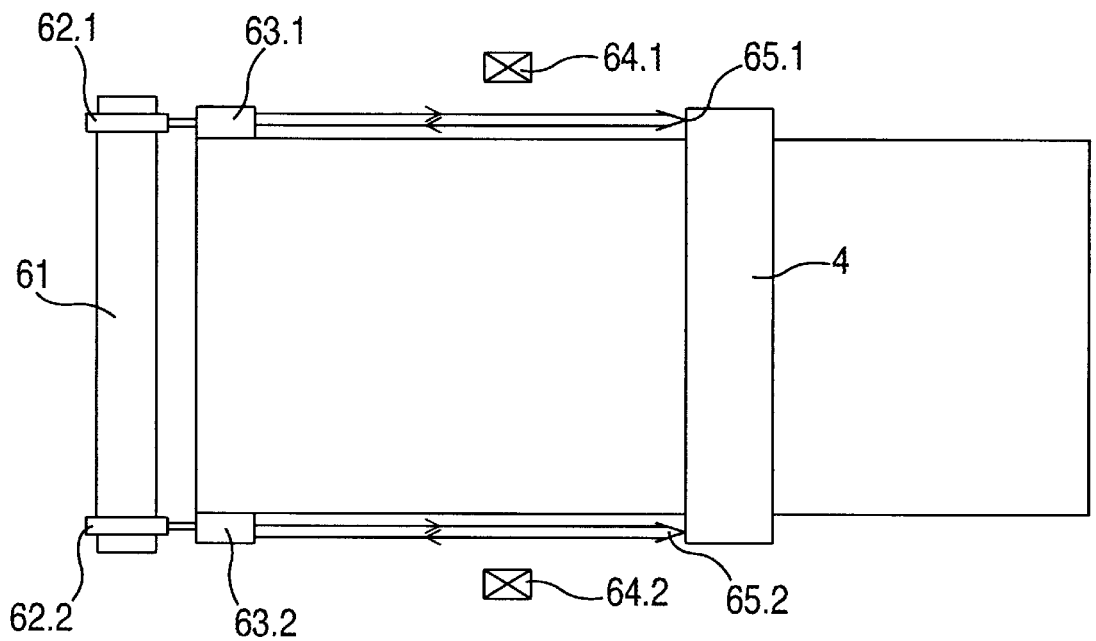
FIG. 7 shows a sixth embodiment of an arrangement according to the present invention.

FIG. 7 depicts a further exemplary embodiment according to the present invention. Two probes 62.1 and 62.2 are provided on connecting bridge 61 in order to ascertain the position of measurement systems 63.1 and 63.2. These measurement systems 63.1 and 63.2 are implemented using laser interferometers, meaning that only one connecting bridge 61 needs to be provided on one side of the machine. Laser interferometers 63.1 and 63.2 each contain a retroreflector 65.1 and 65.2 to reflect the measurement beam from gantry axis 4 into interferometer arrangement 63.1, 63.2. Also provided are detectors 64.1 and 64.2 in order to identify the environmental conditions influencing the wavelength of the laser beam. If the machine geometry changes, for example as a result of temperature fluctuations, laser interferometer 63.2 shifts relative to laser interferometer 63.1, and this shift can be ascertained and compensated for by way of the measurement signals of probes 62.1 and 62.2. This ensures that the drive systems of gantry axis 4 run synchronously, and the axis cannot jam. Connecting bridge 61 is once again made of a material that exhibits the smallest possible temperature-dependent change in geometry.

Figure 8:
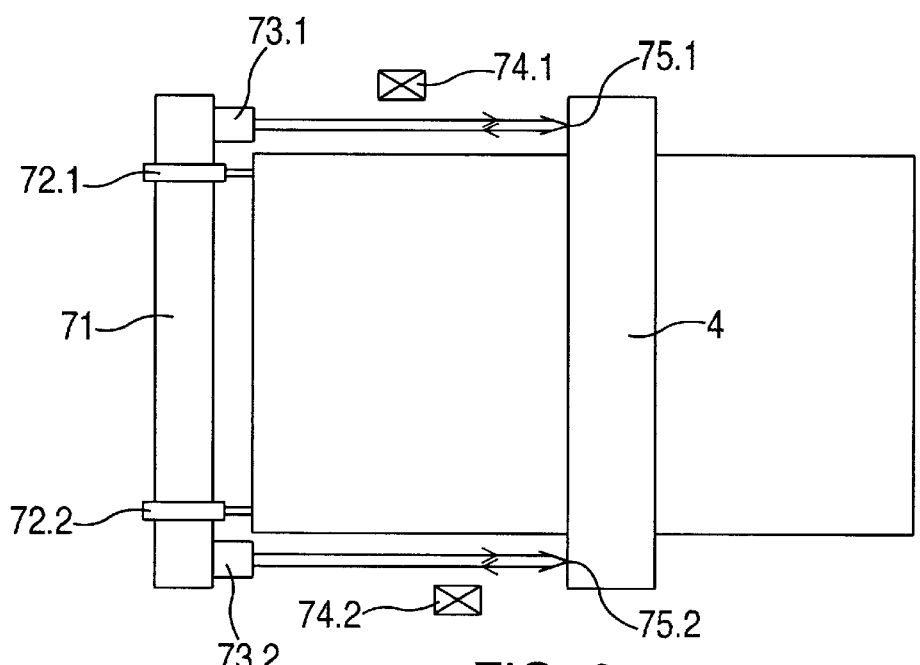
FIG. 8 shows a seventh embodiment of an arrangement according to the present invention.

A variation of the embodiment of FIG. 7 is depicted in FIG. 8. Two parallel laser interferometers 73.1 and 73.2, with associated detectors 74.1 and 74.2 and retroreflectors 75.1 and 75.2, are provided. Laser interferometers 73.1 and 73.2, however, are mounted on the temperature-stable connecting bridge 71. As a result the additional probes 72.1 and 72.2 are no longer necessary, since in this embodiment the laser interferometers themselves are mounted on the temperature-stable connecting bridge 71. The additional probes 72.1, 72.2 can be used to detect large changes in the geometry of the machine which present a risk that gantry axis 4 might no longer remain in the guides provided. In such a situation, a warning message can be issued, containing the information that the machine geometry no longer allows proper operation.

Figure 9:
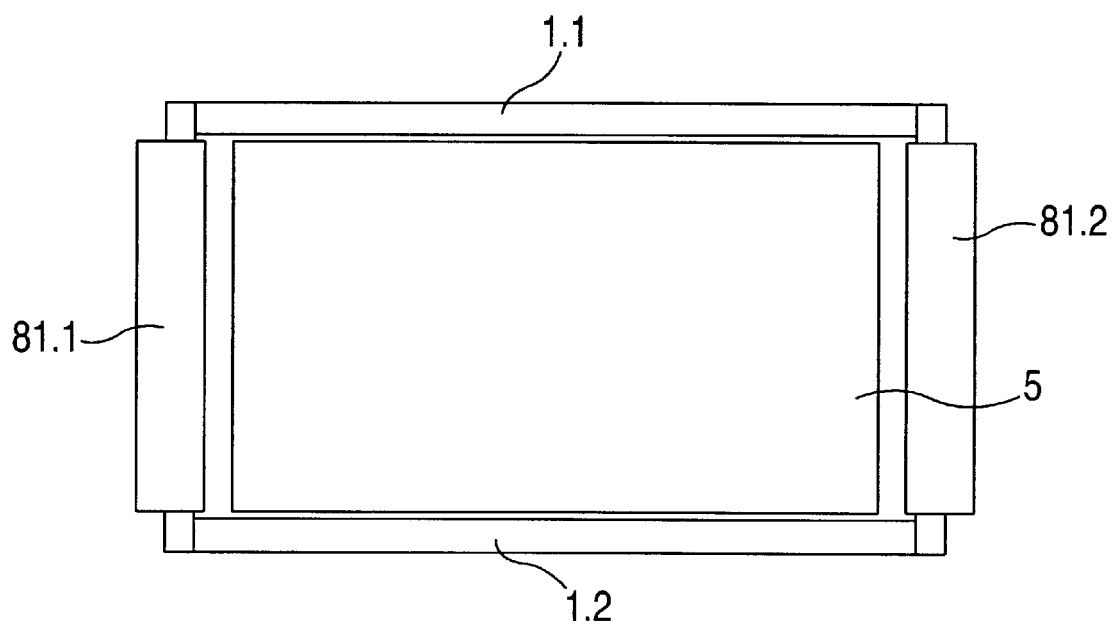
FIG. 9 shows an eighth embodiment of an arrangement according to the present invention.

FIG. 9 shows a further embodiment of the arrangement according to the present invention. Two parallel scales 1.1 and 1.2 are stretched between two temperature-stable connecting bridges 81.1 and 81.2. There does not need to be any contact with the machine located between scales 1.1 and 1.2 and connecting bridges 81.1 and 81.2, once the entire arrangement made up of machine, connecting bridges 81.1, 81.2, and scales 1.1, 1.2 has been calibrated. Since scales 1.1 and 1.2 are joined only to temperature-stable connecting bridges 81.1 and 81.2 and are under tension, they have no ability to deform as a function of temperature in such a way that measurement errors occur. A temperature-related change in the geometry of the machine therefore has no influence on the measurement systems. The lengths at both ends of scales 1.1 and 1.2, which are necessary only for attachment to connecting bridges 81.1 and 81.2, do not need to have any graduation structure.

Figure 10:
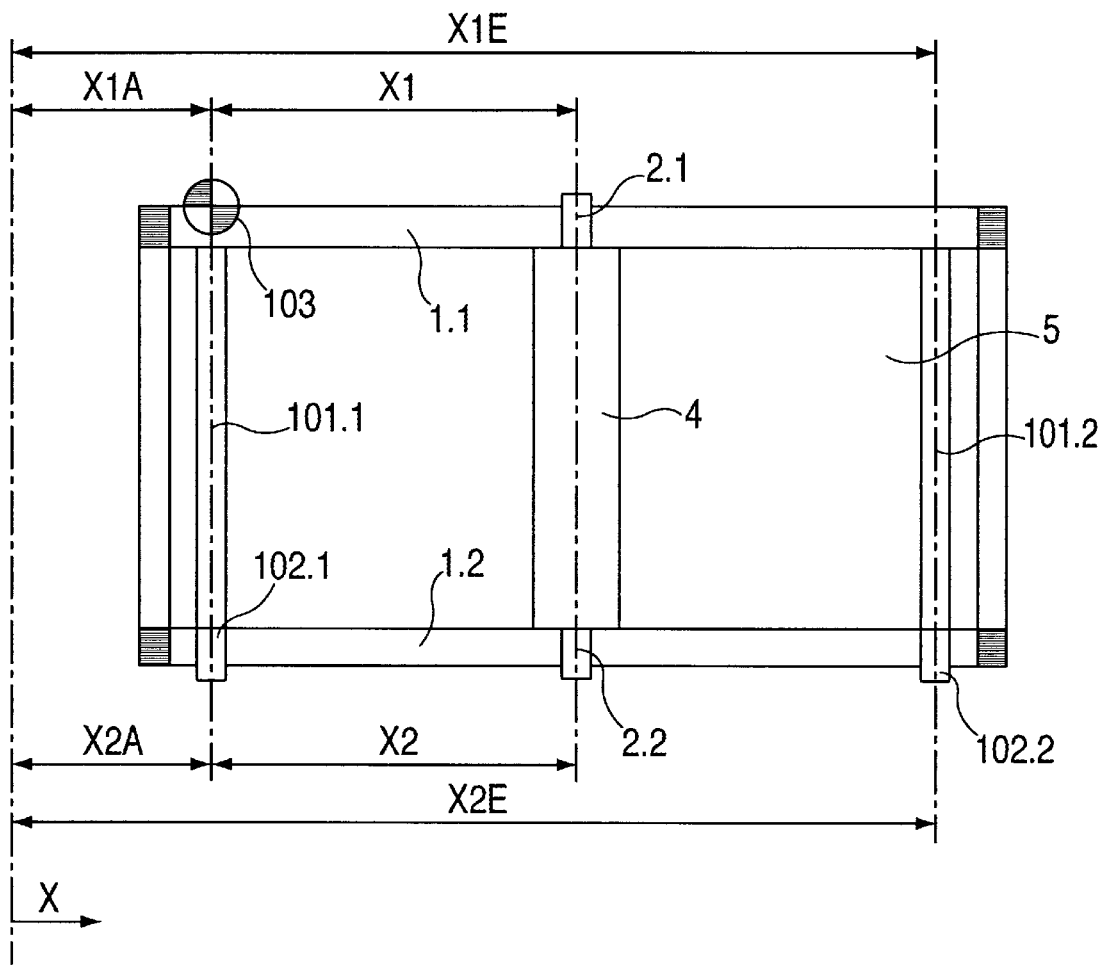
FIG. 10 shows the designations of the measured values of an arrangement as shown in FIG. 3.

A method suitable for compensating for the relative shift of scales 1.1 and 1.2 with respect to one another will be described and explained below. In order to compensate for the relative shift of scale 1.2 with respect to scale 1.1 in measurement direction x, the following designations have been selected as depicted in FIG. 10:

| | |
|---|---|
| 1.1 | First scale with respect to which the relative shift of second scale 1.2 is measured; |
| 1.2 | Second scale that shifts relative to first scale 1.1 as a result of thermal expansion; |
| 2.1 | Scanning head of gantry axis 4 for scale 1.1; |
| 2.2 | Scanning head of gantry axis 4 for scale 1:2; |
| 4 | Gantry axis which is displaced in measurement direction x; |
| 5 | Machine bed |
| 101.1 | Connecting bridge between first and second scale in the region of a first end of the scales; |
| 101.2 | Connecting bridge between first and second scale in the region of a second end of the scales; |
| 102.1 | Scanning head attached to connecting bridge 101.1 in the region of a first end of the scales; |
| 102.2 | Scanning head attached to connecting bridge 101.1 in the region of a second end of the scales; |
| 103 | Reference point of the entire arrangement in measurement direction x; |
| x | Measurement direction of the two scales; |
| X1A | Position of the beginning of the measurement range of scale 1.1 in measurement direction x; |
| X2A | Position of the beginning of the measurement range of scale 1.2 in measurement direction x; |
| X1E | Position of the end of the measurement range of scale 1.1 in measurement direction x; |
| X2E | Position of the end of the measurement range of scale 1.2 in measurement direction x; |
| X1 | Actual position of gantry axis 4 in the measurement direction on scale 1.1; |
| X2 | Actual position of gantry axis 4 in the measurement direction on scale 1.2; |
| A2.1 | Output value of scanning head 2.1; |
| A2.2 | Output value of scanning head 2.2; |
| A102.1 | Output value of scanning head 102.1 |
| A102.2 | Output value of scanning head 102.2. |

Positions measured at a temperature other than the calibration temperature (e.g. 20 degrees Celsius) are identified by prime numerals. For example, X1A' indicates the position of the beginning of the measurement range of scale 1.1 in measurement direction x at a temperature other than the calibration temperature (20 degrees Celsius).

If a measurement system or scales attached to the machine on only one side in region X1A and X2A is used, as depicted in FIG. 6, the assumption to compensate for the output value of scanning head 2.2 of gantry axis 4 is a temperature-related change in the geometry of the machine in which scale 1.2 has shifted under scanning head 102.1. The output value A2.2 of scanning head 2.2 is then compensated for using the following equation:

$$A2.2 = A102.1' + A2.2'.$$

In other words, the position value A2.2' in measurement direction x ascertained by scanning head 2.2 is added to the shift A102.1' by which the attachment point of scale 1.2 has shifted relative to the attachment point of scale 1.1.

If an arrangement according to the present invention as depicted in FIG. 7 is used, the assumption used in order to compensate for the output value X2' of laser interferometer 63.2 so as to determine the position of gantry axis 4 is a temperature-dependent change in the geometry of the machine in which the value of probes 62.1 and 62.2 mounted on temperature-stable connecting bridge 61 has changed differently in response to a temperature change. The output value AW of laser interferometer 63.1 is then compensated for using the following equation:

$$X2' = X1A' - X2A' + X1.$$

In other words, the value measured by the measurement system (implemented by laser interferometer 63.1) is added to the shift of the machine in the measurement direction as measured by the two probes 62.1 and 62.2. The aforesaid calculation method must be correspondingly modified if the shifting of the measurement systems relative to one another in the measurement direction is greater on the other side of the machine.

If a measurement system or scales attached to the machine on two sides, in region X1A, X2A and in region X1E, X2E, is used, as depicted in FIG. 3, the assumption used in order to compensate for the output value of scanning head 2.2 of gantry axis 4 is a temperature-dependent change in the geometry of the machine in which scale 1.2 has shifted under both scanning heads 102.1 and 102.2. The output value A2.2 of scanning head 2.2 is then compensated for using the following equation:

$$A2.2' = A102.1' + A2.1 + A2.1*(A102.2' - A102.1')/l$$

where l is the length of scale 1.2. This equation uses a linear model of the temperature-related expansion to compensate for the shifting of the two scales relative to one another.

In the case of an arrangement according to the present invention of the measurement systems as shown in FIGS. 2, 4, or 5, the output value A2.2 of scanning head 2.2 is compensated for as follows:

$$A2.2' = l*(A102.1' + A2.1)/(l - A102.1' + A102.2').$$

Here again, a linear model for the shifting of scale 1.2 relative to scale 1.1 is assumed, and a corresponding linear compensation is performed.

The compensation methods described above are preferably performed using digital assemblies, to which the necessary measured values of the measurement systems and of the further measurement devices arranged on the connecting bridges are delivered. These digital assemblies are either arranged as an interface between the measurement systems and measurement devices, and at least one further processing unit for the measurement signals, or are integrated into the further processing unit. In the case of a realization as an interface, the latter simply outputs the corrected measured values of the two measurement systems.

What is claimed is:

1. An arrangement comprising:
    first and second length measurement systems positioned parallel to each other at a machine, the length measuring systems being set apart from one another at right angles to a measurement direction;
    at least one connecting bridge between the two length measurement systems for reducing temperature-related dimensional discrepancies in the length measurement systems;
    the at least one connecting bridge being rigidly joined to a first length measurement system at a first point in measurement direction; and
    at least one measurement device to measure a temperature-dependent shift between the connecting bridge and the second length measurement system in the measurement direction.

2. The arrangement as recited in claim 1, wherein the connecting bridge between the two parallel length measurement systems is a light beam.

3. The arrangement as recited in claim 2, wherein the measurement device which measures the relative shift of the two length measurement systems with respect to one another, comprises at least two light-sensitive diodes arranged one behind another in the measurement direction.

4. The arrangement as recited in claim 1, wherein the at least one connecting bridge extends substantially perpendicularly to the measurement direction, the at least one connecting bridge being attached adjacent one of an end of the first length measurement system and a connecting point of the scale of the first length measurement system to the machine.

5. The arrangement as recited in claim 4, wherein the connecting bridge has a scanning head via which the scale of the second length measurement system is scanned.

6. The arrangement as recited in claim 4, wherein, at the other end, the connecting bridge has a probe via which at least one end of the scale of the second length measurement system or the region of the machine in which this scale is fastened to the machine is scanned.

7. The arrangement as recited in claim 1, wherein one connecting bridge and one measurement device are provided in the measurement direction in the region of both ends of the length measurement systems.

8. The arrangement as recited in claim 1, wherein the length measurement systems have one end rigidly joined to the machine by the connecting bridge, the connecting bridge being rigidly connected to one of the machine and the first length measurement system at one connecting point adjacent to one end of the first length measurement system, and wherein a scanning head is provided at one end of the connecting bridge for the second length measurement system, and further wherein temperature sensors are disposed at other ends of the length measurement systems.

9. An arrangement comprising:
first and second length measurement systems positioned parallel to each other at a machine, the length measuring systems being set apart from one another at right angles to a measurement direction;
at least one connecting bridge between the two length measurement systems for reducing temperature related dimensional discrepancies of the length measurement systems, wherein the at least one connecting bridge is joined without a rigid connection to the machine and the length measurement systems, thereby rendering the connecting bridge independent from changes in geometry of the machine;
a first measurement device to measure a temperature-dependent shift between the connecting bridge and the first length measurement system in the measurement direction; and
a second measurement device to measure a temperature-dependent shift between the connecting bridge and the second length measurement system in measurement direction.

10. The arrangement as recited in claim 9, wherein each of the at least one connecting bridge is disposed in measurement direction, opposite the ends of the length measurement systems, further comprising measurement devices attached to the connecting bridges, the measurement devices measuring shifting of the machine and of the length measurement systems in the measurement direction.

11. The arrangement as recited in claim 9, further comprising laser interferometers having lasers attached to the machine forming the length measurement systems, wherein a shifting of the lasers due to a temperature-dependent geometry change of the machine in measurement direction is determined by probes disposed on a connecting bridge.

12. An arrangement comprising:
first and second length measurement systems positioned parallel to each other at a machine, the length measurement systems being set apart from one another at right angles to a measurement direction;
a connecting bridge between the two length measurement systems for reducing temperature-related dimensional discrepancies of the length measurement systems, wherein the connecting bridge is joined without a rigid connection to the machine, thereby rendering the connecting bridge independent from changes in geometry of the machine;
a rigid connection between the connecting bridge and the first length measurement system being provided at the point at which the connecting bridge meets the first length measurement system; and
a rigid connection between the connecting bridge and the second length measurement system being provided at the point at which the connecting bridge meets the second length measurement system.

13. The arrangement as recited in claim 12, wherein each of two connecting bridges is disposed along the measurement direction, opposite the ends of the length measurement systems, and wherein one end of each of the length measurement systems is rigidly joined to one of the connecting bridges.

14. The arrangement as recited in claim 12, further comprising a gantry structure including a gantry axis, wherein laser interferometers are used as length measurement systems for the gantry axis, and wherein the lasers are attached to the connecting bridge and the retroreflectors are attached to the gantry axis.

* * * * *